Sept. 17, 1968   J. H. ANINGER   3,401,421
CASTER
Filed Oct. 21, 1965

JOHN H. ANINGER
INVENTOR.

3,401,421
CASTER
John H. Aninger, 2031 S. Beverly Glen Blvd.,
Los Angeles, Calif. 90025
Filed Oct. 21, 1965, Ser. No. 499,767
2 Claims. (Cl. 16—25)

ABSTRACT OF THE DISCLOSURE

The subject of this invention is an improved caster for use with portable equipment, instruments and furniture and suitable for installation during and after the production of the aforementioned equipment, selectively.

The subject of this invention is an improvement in casters suitable for supporting furniture and various portable machines, respectively. A conventional caster utilizes a wheel mounted rotatably on a member which is attached to a mounting stem by means of a swivel joint. Such a caster construction is not only complex and expensive, but also presents structural objections because it exerts considerable bending moments and torques on the parts of the caster as well as on the equipment extremity on which it is installed. Further, the traditional caster assemblies require considerable effort to become oriented in the direction of the intended movement, before the latter can be performed. This may be especially inconvenient when the respective portable equipment requires transport over coarse surfaces existing in industrial locales, or over luxurious carpets as may be found in executive offices and elegant residences. In addition thereto, the traditional casters lack an aestetic appearance, which is objectionable for the design of modern or fashionable implements for the home and the industry.

Considering the foregoing, objects of this invention are to provide a caster assembly of straightforward design and construction at a minimum amount of inspection, allowing for inexpensive production, a long maintenance-free operational life, omnidirectional movability, and a form that enhances the style of the piece parts on which these casters will be mounted. Another objective of this invention is to obviate the need for caster orientation before an equipment is moved. Additional features of this invention and improvements over prior art will become apparent from the following description and the accompanying drawing, illustrating typical embodiments of devices in accordance with the subject invention.

Figure 1:
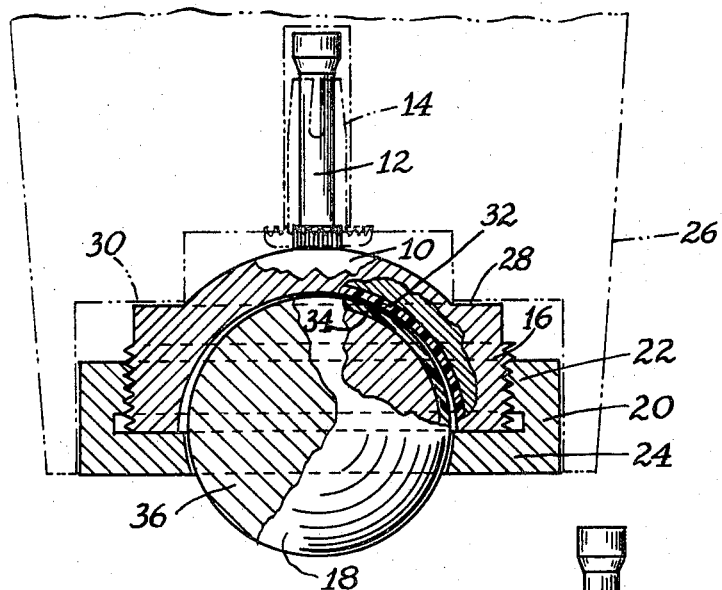
Figure 2:
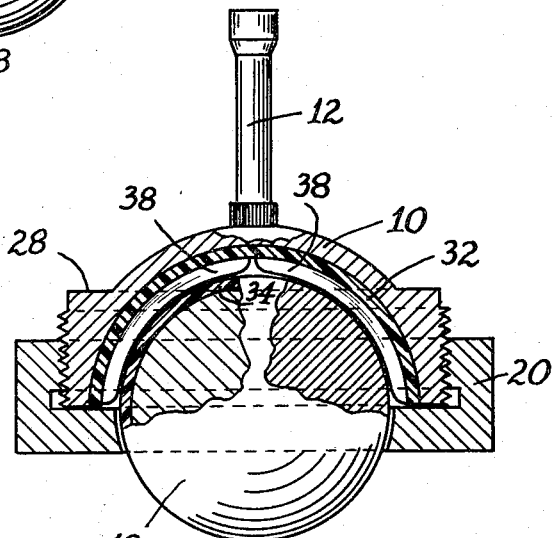
Figure 3:
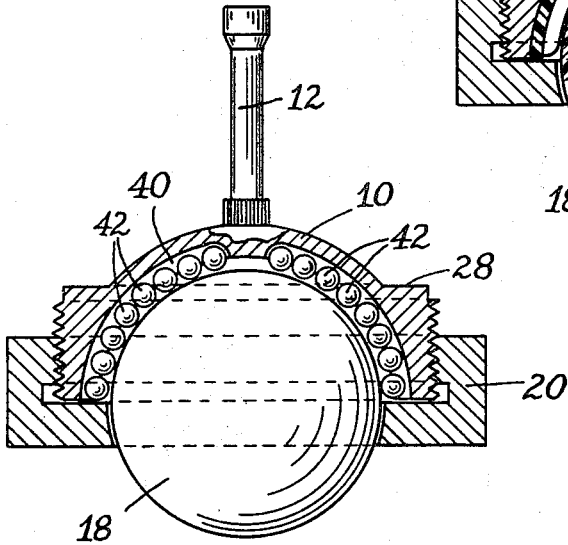

In this drawing, forming a part of this application, shown partly in view and partly in cross-section, FIG. 1 portrays a basic caster assembly in accordance with this invention, FIG. 2 illustrates another caster species, equipped with an anti-friction component, and FIG. 3 indicates a caster species having a ball-bearing type anti-friction arrangement.

Referring now to the drawing, wherein like reference characters designate like or corresponding parts, and particularly to FIG. 1, a semi-spherical housing is shown at 10 having the mounting stem 12 and the customary serrated positioning shell 14 (the latter shown in phantom lines) at its top portion. It should be noted that the axes of the aforementioned two parts are located at the polar centerline of the housing 10. It is obvious that in lieu of said mounting stem mounting plates can be employed by means of fastening screws inserting through the respective mounting holes of a bracket. A threaded housing portion 16 is provided across the largest diameter of the semi-spherical housing 10. A sphere 18 is inserted into the housing 10 and retained therein under adequately loose fit, by means of a gland 20 having a tapped ring portion 22 so as to engage the threaded housing portion 16. The annular extremity plane 24 of gland 20 extends beyond the largest sphere diameter, thusly retaining the sphere 18 within the described assembly. Shown in phantom lines 26 is the contour of, say a chair leg and the bore required to install the caster assembly in the spirit of this invention. The annular flat surface 28 is provided on top of the threaded housing portion 16 serves as a support for the chair leg bore face 30. It is obvious that the described construction permits a chair movement in any desired direction without the need for caster orientation. The FIG. 1 also indicates the attractive appearance of the entire chair leg and caster assembly.

To further increase the operational proficiency of the subject caster, the inside of the housing 10 is equipped with a liner 32 of, say a fluorocarbon resin as, for example, the product known by its trade name "Teflon," having permanent low-friction characteristics. Conversely, the sphere 18 can be provided with a fluorocarbon resin layer 34, whereas the inside surface of the housing 10 displays its original material. If a layer 34 is used, the remaining sphere body can consist of elementary materials as shown in 36. Subject to cost, the sphere 18 can be wholly molded from the aforementioned "Teflon," or equivalent.

A caster assembly having specific anti-friction characteristics is shown in FIG. 2. The inside surface of the housing 10 is lined with a layer 32 of said fluorocarbon resin "Teflon," or equivalent. Formed along meridians from this line 32 are, at least, three ribs 38 extending therefrom and positioned from each other by 120 circular degrees, (whereby the right rib 38 was developed into the drawing plane) thusly providing a geometrically-distinct seating arrangement for the sphere 18 within the caster housing 10, contrary to the generally suitable random play offered by the construction shown in FIG. 1. A design of this quality will be especially desirable, if not necessary, when portable bases carrying delicate laboratory equipment are involved. The modification for the various liner and material selections enumerated in the foregoing for the caster construction as shown in FIG. 1, apply wholly to the caster species presented in FIG. 2, inclusive of its ease of installation into a portable equipment at its favorable inconspicousness upon assembly.

The third caster species described herein within the frame of the generic improvement is illustrated in FIG. 3. In this case, at least, three semi-cylindrical grooves 40, positioned from each other by 120 circular degrees, (whereby the right groove was developed into the drawing plane) are formed, along meridians, into the inside material portion of the caster housing 10. Subsequently, each of these grooves 40 is filled with a plurality of steel balls 42, such as used for anti-friction bearings. The sphere 18 is then inserted and secured to the caster assembly by means of the gland 20. This caster configuration allows for the use of extremely close parts-production tolerances, great operational accuracy resulting in a minimum of friction between moving parts. This caster variety further perimts the application of a considerable choice of materials for each assembly element so long as each material possesses the required hardness. Whereas, for example, the anti-friction balls 42 as well as the sphere 18 can be made of steel, steel can be chosen as the material for the former in combination with a sphere of plastic material, equally operational will be a sphere made of steel coacting with anti-friction balls of a plastic substance. The caster housing 10, although preferably produced from metal, can also be manufactured of a synthetic material, as can be gland 20, which is exposed to the smallest of all acting forces.

The construction of each of the caster varieties in accordance with this invention permits readily the incorporation of a dust-proof feature resulting in long, maintenance-free life expectancy under adverse operating conditions, in a manner well known in the art. It requires the cutting of an annular groove into the gland portion 24, so as to face the sphere 18, and a so-called O-ring disposed within said groove, occupying the annular space between said gland portion and said sphere and preventing the entry of foreign matter into the interior of the caster.

It is understood that the parts, designs, constructions and variations described herein represent but basic embodiments of the subject caster and its species, and that numerous modifications, alterations and rearrangements thereof are possible without departing from the spirit of this invention.

What is claimed is:

1. A caster having a housing so as to form a downwardly-facing semi-spherical open port, a mounting stem extending exteriorly and upwardly from said housing aligned and concentric with the polar axis of said semi-spherical port, a cylindrical, externally-threaded portion along the equatorial perimeter of said semi-spherical port, a sphere lodged within said downwardly facing open port, an annular gland having a cylindrical, internally-threaded portion along its perimeter, its hole formed therein having a diameter smaller than the diameter of said sphere, said gland fastened to said housing by means of said threaded portions so as to retain said sphere movably within said housing, comprising:

at least three ribs formed on the surface of said downwardly-facing semi-spherical open port of said housing made of a first material, each said rib extending along a meridian, and radially toward the center of said semi-spherical open port, said ribs being equally spaced apart from each other longitudinally, and said sphere made of a second material.

2. A caster as defined in claim 1, wherein said second material has properties dissimilar with respect to the properties of said first material.

References Cited

UNITED STATES PATENTS 133,650  12/1872  Lighthall _____ 16—26

BOBBY R. GAY, *Primary Examiner.*

DORIS L. TROUTMAN, *Assistant Examiner.*